United States Patent Office 3,150,958
Patented Sept. 29, 1964

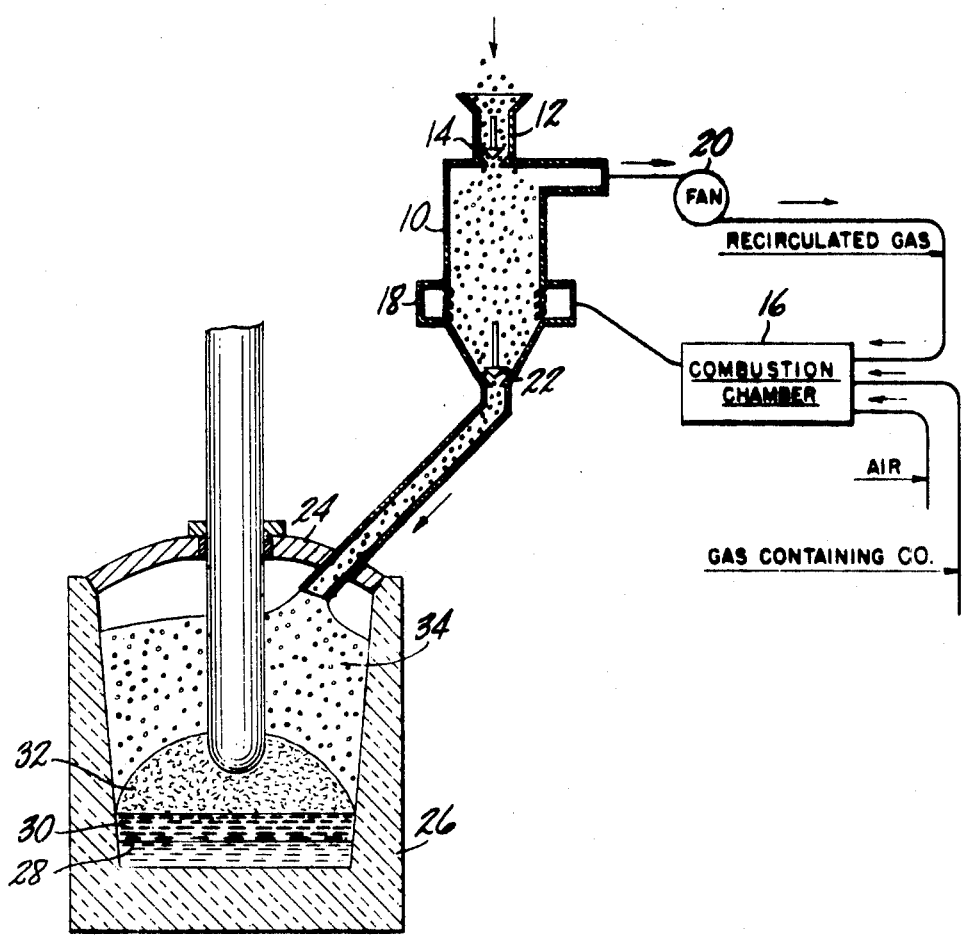

3,150,958
PROCESS FOR THE REDUCTION OF
METALS FROM OXIDE
Fredrik Christen Collin, Ljan, Oslo, Toralv Båsen,
Vagsbygd, near Kristiansand, and Hans Skretting,
Kristiansand, Norway, assignors to Elektrokemisk A/S,
Oslo, Norway, a corporation of Norway
Filed Nov. 24, 1959, Ser. No. 855,047
Claims priority, application Norway Nov. 27, 1958
5 Claims. (Cl. 75—4)

This invention relates to the pretreatment of oxides of the type which may be reduced in an electric smelting furnace. The invention is principally useful in the reduction of various types of iron oxides such as ores which may include the usual iron ores as well as ores which also comprise different metal oxides, such, for example, as chromium oxide or manganese oxide. In any of these cases the process involves the reduction of iron oxide and the other oxides are also reduced.

Since the process does not relate primarily to the reduction of the oxide but to the pretreatment step, the invention of this process may also be used in an equivalent manner for other similar operations of the type carried on in the smelting furnace, such as the production of ferrosilicon, the production of elemental phosphorus from phosphates and of calcium carbide from lime, calcium hydrate and calcium carbonate.

In carrying out this process a substantial part of the carbonaceous reducing agent is incorporated with the oxide which is prepared in the form of molded aggregates such as pellets, briquettes, extruded pieces or the like. We recognize that the inclusion of reducing agent in the aggregates is not of itself novel, but we know of no case where such a process has gone into commercial operation in the reduction of iron ores. The reason for this is that heretofore the consumption of carbon in such processes has been extremely high.

In carrying out our invention a particular feature is that the amount of carbonaceous material that is incorporated into the aggregates in powdered form is less than the stoichiometric quantity necessary for complete reduction. The amount thus included in the aggregates may range from 25% to 90% of the total amount of carbonaceous material and the balance of what is required (that is, from 10% to 75%) is added separately in the form of lumpy carbonaceous material. By the term "lumpy carbonaceous material" we mean coal, coke or the like which has been coarsely crushed so that at least 75% of the mass will have a particle size with a diameter of ¼" or more. At the upper end the particle size of the lumps is not critical, but it is desirable that 75% of the lumpy material fall within the range of between ¼" diameter and 2" diameter. Some of the lumps may be even larger. The reason for including part of the carbonaceous material in this lump form will be brought out in connection with the detailed description of our invention.

The second requirement for our process is that the prepared aggregates, containing a limited percentage of the carbonaceous reducing agent, shall be preheated at a temperature of between 500° C. and 900° C. in a gas which is substantially oxygen-free and contains a limited percentage of $CO_2$. For example, it is advisable that the percentage of CO based on the sum of the $CO+CO_2$ be at least 20% and preferably 25% or more.

The briquettes or pellets should have substantial strength and to this end we include usual forms of binder. These binders may include such materials as Portland and alumina cements, lime hydrate, concentrated waste liquor from the sulfite pulp industry and other bituminous binders. For the process described we prefer to use binders which provide sufficient mechanical strength in the pellets or briquettes so as to permit handling and transport and such strength should come simply as a result of storage, or drying of the pellets or aggregates at a temperature ranging between 100° and 200° C.

When these conditions are met we find that we can obtain a substantial degree of prereduction as well as heating of the pellets so that the power consumption in the electric furnace is substantially reduced and at the same time we can substantially avoid the losses of carbon which result from preheating the pellets at elevated temperatures or in the presence of free oxygen. Specifically, we wish to avoid the situation where pellets are heated up to drive off the CO and this CO is burned with air in the presence of the pellets to obtain further heating. In such case the loss of the carbonaceous reducing agent is very high.

We have found that if temperatures above 900° C. are avoided in the preheating step, consumption of the carbonaceous reducing agent is kept low, but a substantial reduction is had usually to the point where the oxygen in the oxide or ore is reduced by about ⅓, say to such an extend that the content of oxygen is slightly above that of FeO. Ordinarily we prefer to use a temperature of preheating of between 600° and 800° C. or slightly higher, and to carry out this preheating in such a way that substantially no metallic iron is found in the preheated pellets. We have learned by our researches that if none of the iron oxide is converted to the metallic state there is substantially no loss of the carbonaceous reducing agent.

After the pellets are reduced they should be introduced directly into an electric smelting furnace without cooling and without opportunity for reoxidation. If all of the reducing agent is incorporated in the pellets and they are then introduced into the electric furnace we find that there is a tendency for the pellets or briquettes to sink in the slag layer in the furnace with evolution of gas taking place under the slag, producing so-called "slag boiling" and very materially interfering with the operation of the furnace. On the other hand, if a part of the reducing agent is introduced into the furnace in the form of lumps, this appears to form a coke bed over the slag layer and to hold the preheated briquettes or pellets out of the slag until they are fully reduced by the carbon of such coke bed. This makes for smooth and efficient operation of the furnace.

The percentage of carbonaceous reducing agent that may be introduced in the lumpy form can be varied within wide limits. As stated above, we can have the amount introduced in this form from somewhere between 10% and 75% of the whole. To obtain the best results we have found that we should have between 40% and 60% of the carbonaceous material introduced in the lumpy form and very good results have been had when this material is equal to approximately 50% of the whole. The lumpy carbonaceous material and the aggregates should be introduced into the furnace either together or at the same time so that they will blend in the furnace as the charge descends.

The apparatus for carrying out our preheating step is not critical. We have found that the operation can be done very efficiently in a shaft furnace, but if preferred, other forms of apparatus may be used; for example, pellets may be supported on movable or stationary grate bars and the properly controlled gas passed up through the grate bars. In such case ordinarily the grate bars should be covered by a hood so that the gas can be collected for recirculation if necessary.

The lumpy carbon may be introduced into the furnace separately from the pellets or may be mixed with the pellets before the latter are introduced into the preheating chamber. The electric furnace preferably is a usual type of submerged arc resistance furnace and may be of either single phase or triple phase as is well understood in this field.

For the purpose of illustration we give an example of a way in which our invention can be carried out, reference being had to the accompanying drawings which indicate the apparatus diagrammatically.

We mixed together a charge containing the following components:

| | Percent |
|---|---|
| Magnetite concentrate (from the Syd-Varanger Mine) | 77.9 |
| Steam coal (Longyear steam coal from Spitzbergen) | 16.25 |
| Al oxide | 0.85 |
| Portland cement | 5 |

These ingredients were mixed in a dry concrete mixer and then put onto a saucer-type pelletizer about 1½ m. in diameter where the powder was sprayed with water sufficient to bring the moisture content up to about 10%. Pellets were produced at the rate of approximately 100 kgs. per hour and the diameter of the pellets was 15 mms. to 25 mms. These raw pellets having a crushing strength of about 3 to 5 kilos were transferred to storage on the floor. After three days hardening of the cement the strength of the pellets increased to between 25 to 50 kilos which was found to be satisfactory for handling and transport.

About 346 kgs. of such pellets (containing 153 kgs. of fixed carbon per 950 kgs. Fe, equal to 1 ton of pig iron) was mixed with 30 kgs. of gas coke crushed to an average diameter of 10 to 20 mm., 10 kgs. of limestone crushed to an average diameter of 5 to 25 mms. and 14 kgs. of dolomite crushed to an average diameter of from 3 to 25 mms. A mixture in this proportion was introduced into a preheating shaft furnace as indicated at 10 in the accompanying drawing. This furnace was provided with a hopper as shown at 12 and the feed into the furnace was controlled by a valve 14.

Gas containing a large excess of CO obtained from the electric smelting furnace and later combined with recirculated gas was introduced into the combustion chamber 16 with air to burn part of the CO, but care was taken to measure the air so there was a slight deficiency in order that there should be virtually no free oxygen in the products of combustion and some CO would remain in the heating gas. The hot gases from the combustion chamber 16 were introduced into the shaft furnace 10 through a ring 18 and gases passed upwardly through the shaft furnace and were withdrawn at the top by a fan 20. During the preheating step carbon in the pellets reacted with the oxygen of the ore to give a partial reduction and a generation of additional CO gas. As substantially no free oxygen was present this did not burn in the presence of the ore but was withdrawn and burned separately.

The preheating shaft 10 was 100 cm. high and about 52 cm. in diameter and was lined with fireproof brick. Gases introduced through the ring 18 had an inlet temperature of 760° C. and the gases withdrawn by the fan 20 had an outlet temperature of about 270° C. The charge remained in the furnace for about 45 min. and the charge reached a temperature of approximately 700° C. At this temperature the volatiles were largely driven out of the coal and the remaining carbon appeared to form a structure that added strength to the pellets.

The charge was dropped out of the furnace intermittently in small portions by a gate indicated at 22. It then passed directly through steel feed pipes to the brick roof 24 of an electric furnace 26. A check up on the pellets showed that during their passage through the shaft only a small fraction (perhaps 10%) of the pellets broke up to smaller pieces. The rest retained their shape in the shaft and under the drop into the electric furnace. Accordingly, the electric furnace charge was exceptionally porous and descended easily with a lower angle of repose than a normal charge. The electric furnace operation was steady with even sinking of the charge; no poking was required and there was no slag boil. Despite the fact that the charge pellets and lumpy part of the charge were preheated and the iron oxide partly prereduced the electrical resistance of the furnace was substantially the same as that for direct smelting of a coal sintered magnetite charge with the same furnace kw. load and voltage. The penetration of the electrode into the charge was approximately 12″ which is normal for such a furnace on pig iron smelting. The surprisingly high resistance in the charge is undoubtedly due to the absence of metallic iron at the surface of the pellets, the iron oxides having been prereduced to a stage between $Fe_3O_4$ and FeO.

As the operation continued, ordinarily a part of the gases withdrawn by the pump 20 containing additional quantities of CO, were recirculated back to the combustion chamber and burned with additional quantities of CO containing gas from the electric furnace and air. The free oxygen content in the heating gas was below 0.5% $O_2$.

In this operation the power consumption, corrected to 1% Si in the iron, was 1470 kwh. and the carbon consumption was 293 kgs. of fixed carbon per ton. The percentage of fixed carbon introduced in the pellets was about 52%, and that introduced in the form of lump coke was about 48%.

For comparison, the smelting of sintered magnetite concentrate smelted directly in the conventional way in a similar furnace demands about 2300 kwh. and 325 kgs. of fixed carbon per ton. The carbon as well as the power consumption for the process depend on the pretreatment temperature and the extent of prereduction obtained. The lowest carbon consumption is obtained by a short retention time of 10 to 20 min. in the shaft and by preheating to only approximately 600° C. This however provides only a minimum of reduction (that is, removal of oxygen) from the magnetite. Preheating to this temperature accordingly gives a somewhat higher power consumption (about 1600 kwh. per metric ton) but a minimum of carbon consumption equal to about 260 kgs. per ton.

If the pellets are heated to between 800° C. and 900° C. for a time which may range up to 60 minutes, prereduction to approximately the FeO stage is accomplished. Under such conditions the power consumption may be reduced to as low as 1350 kwh. per ton and the carbon consumption may go up to 300 to 320 kgs. which is slightly better than the usual carbon consumption in normal reduction.

In the electric furnace itself the molten metal (indicated at 28) will collect on the bottom. Over this is a layer of slag 30 and again over this is the choke bed 32 formed by the lumpy coke which floats on the slag. This coke bed carries the charge 34 made up of a mixture of pellets and lumpy reducing agent so that the pellets are finally reduced by contact with such coke bed and cannot get into contact with the slag bath until they are so reduced.

From the foregoing it is seen that this process can be operated with great economy and the emphasis of economy may be put either on reduction of fixed carbon used or on the power consumption. In most cases it will be found expedient to keep the power consumption at a minimum.

It is understood that the example given is intended only by way of illustration and that the same may be modified in many particulars.

What we claim is:

1. The process of preheating molded aggregates of iron oxide and powdered carbonaceous material for reduction in an electric furnace which comprises heating such aggregates in a current of hot gases comprising CO and substantially free of air to a temperature between 500° C. and 900° C. whereby such aggregates are preheated and partly reduced and additional quantities of CO gas are generated, withdrawing CO gas so generated from the oxide and burning it out of contact with oxide being treated with additional CO gas and with less than the required amount of air to burn all the CO and passing hot products of the combustion at a temperature of between 500° C. and 900° C. into direct contact with additional quantities of such molded aggregates whereby such additional molded aggregates are preheated.

2. A process as specified in claim 1 in which the gas for preheating the aggregates contains CO in a percentage at least equal to 20% of the aggregate of the CO and $CO_2$ in such gas.

3. A process as specified in claim 1 in which the aggregates are preheated to a temperature of about 700° C.

4. A process as specified in claim 1 in which aggregates are treated in the hot CO gas as specified, in the presence of additional quantities of lumpy carbonaceous material which is thereby heated but remains substantially unconsumed, and after such treatment the aggregates and the additional carbonaceous material are introduced without substantial cooling into an electric smelting furnace.

5. The process of preparing a charge for the electric smelting of iron oxides which comprises forming molded aggregates of the oxide in powdered form with less than a stoichiometric amount of powdered carbonaceous material required to reduce such oxide, mixing such aggregates with lumpy carbonaceous material in an amount equal to between 10% and 75% of the total carbonaceous material necessary for reducing the oxide, heating such mixture in the substantial absence of free oxygen to a temperature of between 500° C. and 900° C. by the direct contact of gas recycled through such mixture and maintained at the desired temperature by blending with products of combustion resulting from burning CO gas with an insufficient amount of air to consume all of the CO present, whereby the iron oxide is partially reduced but lumpy carbonaceous material remains in the mixture, withdrawing the mixture from the hot gases used for heating the same before any substantial amount of the oxide is reduced to the metallic state and introducing such mixture comprising hot iron oxide and lumpy carbonaceous material into the smelting zone of an electric smelting furnace.

References Cited in the file of this patent
UNITED STATES PATENTS

| | | |
|---|---|---|
| 1,080,344 | Hilliard | Dec. 2, 1913 |
| 1,489,361 | Moxham | Apr. 8, 1924 |
| 1,588,420 | Hindshaw | June 15, 1926 |
| 2,536,365 | Handwerk et al. | Jan. 2, 1951 |
| 2,805,929 | Udy | Sept. 10, 1957 |
| 2,964,308 | Walde | Dec. 13, 1960 |
| 2,999,748 | Basen | Sept. 12, 1961 |